(12) United States Patent
Dhua et al.

(10) Patent No.: US 10,593,066 B1
(45) Date of Patent: Mar. 17, 2020

(54) COMPRESSION OF MULTI-DIMENSIONAL OBJECT REPRESENTATIONS

(71) Applicant: A9.com, Inc., Palo Alto, CA (US)

(72) Inventors: Arnab Sanat Kumar Dhua, Mountain View, CA (US); Neil Raj Kumar, Redwood City, CA (US); Karl Hillesland, San Carlos, CA (US); Radek Grzeszczuk, Menlo Park, CA (US); Scott Paul Robertson, San Mateo, CA (US)

(73) Assignee: A9.COM, INC., Palo Alto, CA (US)

( * ) Notice: Subject to any disclaimer, the term of this patent is extended or adjusted under 35 U.S.C. 154(b) by 48 days.

(21) Appl. No.: 15/866,177

(22) Filed: Jan. 9, 2018

Related U.S. Application Data

(60) Provisional application No. 62/566,050, filed on Sep. 29, 2017.

(51) Int. Cl.
| | |
|---|---|
| *G06T 9/00* | (2006.01) |
| *G06T 7/70* | (2017.01) |
| *G06T 7/60* | (2017.01) |
| *G06T 7/194* | (2017.01) |
| *G06T 7/11* | (2017.01) |

(Continued)

(52) U.S. Cl.
CPC ............... *G06T 9/001* (2013.01); *G06T 7/11* (2017.01); *G06T 7/194* (2017.01); *G06T 7/60* (2013.01); *G06T 7/70* (2017.01); *G06T 15/205* (2013.01); *G06T 17/20* (2013.01); *G06T 2207/20132* (2013.01); *G06T 2207/30244* (2013.01)

(58) Field of Classification Search
CPC ... G06T 7/11; G06T 7/194; G06T 7/60; G06T 7/70; G06T 9/001; G06T 15/2015; G06T 17/20; G06T 2207/20132; G06T 2207/30244
See application file for complete search history.

(56) References Cited

U.S. PATENT DOCUMENTS

| | | |
|---|---|---|
| 5,850,352 A | 12/1998 | Moezzi et al. |
| 10,347,045 B1 | 7/2019 | Dhua et al. |

(Continued)

OTHER PUBLICATIONS

Tung-Ming Koo, "Improved Fractal Image Compression: Centered BFT with Quadtrees," Dissertation, Oklahoma State University, 1995 (Year: 1995).*

(Continued)

*Primary Examiner* — Soo Shin
(74) *Attorney, Agent, or Firm* — Hogan Lovells US LLP

(57) ABSTRACT

Objects can be rendered in three dimensions and viewed and manipulated in an augmented reality environment. A number of object images, a number of segmentation masks, and an object mesh structure are used by a client device to render the object in three dimensions. The object images and segmentation masks can be sequenced into frames. The object images and segmentation masks can be partitioned into patches and sequenced, or ordered, within each patch, and a keyframe can be assigned in each patch. Then, the object images and segmentation masks can be encoded into video files and sent to a client device. The client device can quickly retrieve a requested object image and segmentation mask based at least in part on identifying the keyframe in the same patch as the object image and segmentation mask.

20 Claims, 13 Drawing Sheets

(51) Int. Cl.
  *G06T 17/20*   (2006.01)
  *G06T 15/20*   (2011.01)

(56) References Cited

U.S. PATENT DOCUMENTS

| | | |
|---|---|---|
| 2003/0098864 A1 | 5/2003 | Ohno |
| 2005/0264560 A1* | 12/2005 | Hartkop ................. H04N 13/31 |
| | | 345/419 |
| 2005/0265383 A1* | 12/2005 | Melpignano .......... H04L 1/0014 |
| | | 370/465 |
| 2007/0133865 A1 | 6/2007 | Lee et al. |
| 2008/0050047 A1* | 2/2008 | Bashyam .................. G06T 9/00 |
| | | 382/305 |
| 2009/0244309 A1 | 10/2009 | Maison et al. |
| 2009/0303329 A1 | 12/2009 | Morisaki |
| 2015/0334398 A1 | 11/2015 | Socek et al. |
| 2016/0286239 A1* | 9/2016 | Sato ....................... H04N 19/70 |

OTHER PUBLICATIONS

Notice of Allowance issued in co-related U.S. Appl. No. 15/824,697 dated Feb. 25, 2019.

Notice of Allowance issued in co-related U.S. Appl. No. 16/411,642 dated Jun. 19, 2019.

\* cited by examiner

COMPRESSION OF MULTI-DIMENSIONAL OBJECT REPRESENTATIONS

This application claims priority to and the benefit of U.S. Provisional Patent Application No. 62/566,050, filed Sep. 29, 2017, the entirety of which is incorporated by reference herein.

BACKGROUND

Users are increasingly purchasing items over the Internet. Accordingly, when a customer receives an item, it may be the first time he or she has viewed the item in person. The item may not look the same way the customer envisioned based on photographs viewed online. For example, a customer may order a lamp to place on an end table, but when the ordered lamp is physically placed on the table, the customer might not be pleased with its size or style, particularly relative to other items in the room. Providing a photorealistic rendering of the object may help with the ordering process. This may require the sending of multiple object images to a client device to render the object on the client device. Current compression techniques are insufficient for sending a large number of images to a client device for local rendering.

BRIEF DESCRIPTION OF THE DRAWINGS

Various embodiments in accordance with the present disclosure will be described with reference to the drawings, in which:

FIGS. 10A-D illustrate example frame configurations that can be utilized in accordance with various embodiments.

DETAILED DESCRIPTION

Figure 1A:
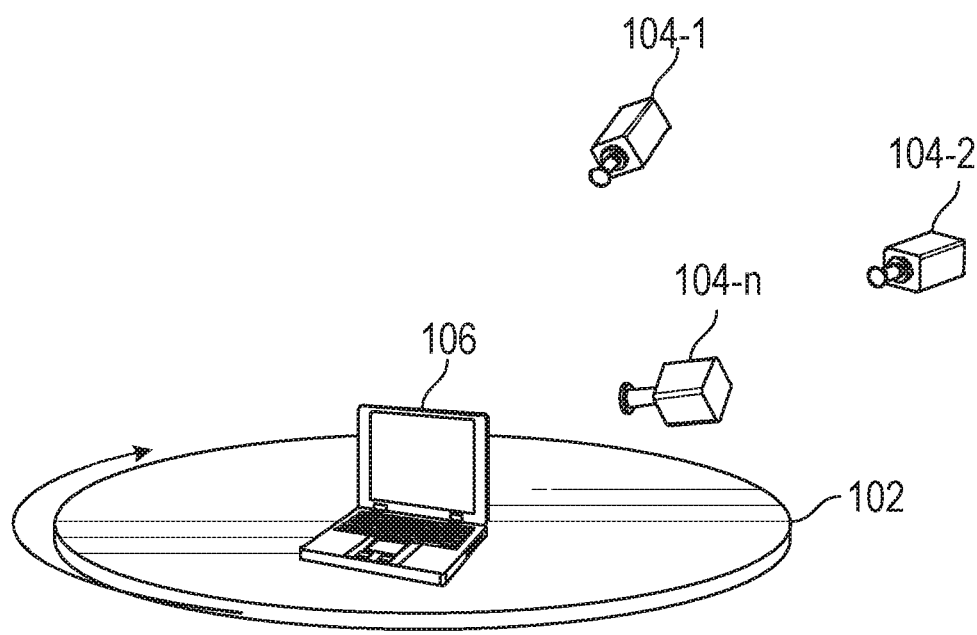
FIGS. 1A-B illustrate an example image capture system that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to compressing representations of objects. In particular, various embodiments provide compressing multi-dimensional images of objects, such as those provided through an electronic marketplace or other such interface. In various embodiments, a plurality of images representing various viewpoints of an object can be captured. The images can be processed into various segmentation masks, where these masks can indicate pixels corresponding to the object and pixels that do not correspond to the object. In various embodiments, the segmentation masks can be used to generate a three-dimensional object mesh structure, which portrays the three-dimensional structure of the object being rendered. In embodiments, the object images, segmentation masks, and object mesh structure are all sent to a client device to render a photorealistic representation of the object on the client device. A user can view the three-dimensional object mesh structure overlaid by the appropriate object image corresponding to the viewpoint requested by the user. This photorealistic representation can be viewed, for example, in an augmented reality setting, where the user can view a representation of an object overlaying a representation of the physical environment.

In various embodiments, the client device package, including a number of object images, segmentation masks, and the object mesh structure, may have a large enough file size to present challenges transmitting the package to a mobile device and managing the package on the mobile device. For example, transmitting a large file size to a mobile device can be resource intensive and time intensive. A mobile device may also have memory limitations that prevent the quick recall of individual images from a large array of images. A real time user experience turns on the ability to quickly locate a desired image. The techniques described herein compress the images and segmentation masks into significantly smaller file sizes, which increases the speed at which the package is delivered to the device and decreases processing times for the mobile device to render the object. The smaller memory footprint means the client device package can be extracted quickly. The application can be launched and the object rendered quickly as well.

To reduce the payload size of the client device package, the object images and segmentation masks can first be encoded in a video file. For example, the plurality of object images can be treated as frames of a video. The grouping of the frames and determination of reference frames affects the file size and how quickly a random frame can be recalled from the video file. In various embodiments, and as will be described further herein, the video can arrange the images in a spiral configuration. The images can be ordered, or sequenced, consecutively starting at the lowest latitude and moving, for example, clockwise around the object until all images at the lowest latitude have a frame number. Then, the images at the next lowest latitude are sequenced in the same manner, and so on until every image has a frame number.

In embodiments, the images are partitioned, or grouped, before being sequenced into frames. That is, instead of sequencing all images at the same latitude, a group of images representing some local neighborhood of the object is partitioned into a patch. The patch sizes can vary. For example, the object images can be partitioned into 2×2 patches, or four images per patch. These images represent four adjacent viewpoints of the object, two at a first latitude, and two at the immediately higher latitude. Other patch sizes, such as 3×3, 2×3, etc, can be used as well. A patch size of 1×1 effectively corresponds to the spiral based sequencing described above.

Images can be sequenced within a patch before sequencing continues within the next patch. For example, if 2×2 patches are used, the first four frames of the video will be the four frames of the first patch, notwithstanding there will be other frames in other patches at the lowest latitude that have not been sequenced. Frame 5 is then assigned to the first image in the second patch and so on. Images within a patch are mapped to one another, and the patches themselves are ordered. In embodiments, the first, or lowest value, frame in each patch is designated as a keyframe. The keyframe is a reference frame that can be used to quickly locate a random frame. For example, if the object image corresponding to frame 3 is called, it can be determined that frame 3 is in the first patch. Frame 1, the keyframe for the first patch, can be used as a reference to locate frame 3.

The object images can be captured in a number of ways. For example, a multi-camera array can be arranged about a surface to first capture images of the background from different viewpoints. An object can then be placed on the surface and another set of images captured. In embodiments, the surface can be a rotatable platen, such that the platen can rotate to let the stationary camera array capture different viewpoints of the object. The background images can be subtracted from the object images and various artifacts can be removed from the difference image. Using different contrast thresholds, pixels associated with the object can be indicated with varying degrees of confidence. Segmentation masks highlighting the object pixels can then be created for the object images. The segmentation masks can be used to determine a three-dimensional object mesh structure representing the object. As described above, the object mesh structure can be packaged with the object images and segmentation masks and sent to a client device. Various other such functions can be used as well within the scope of the various embodiments as would be apparent to one of ordinary skill in the art in light of the teachings and suggestions contained herein.

Figure 1B:
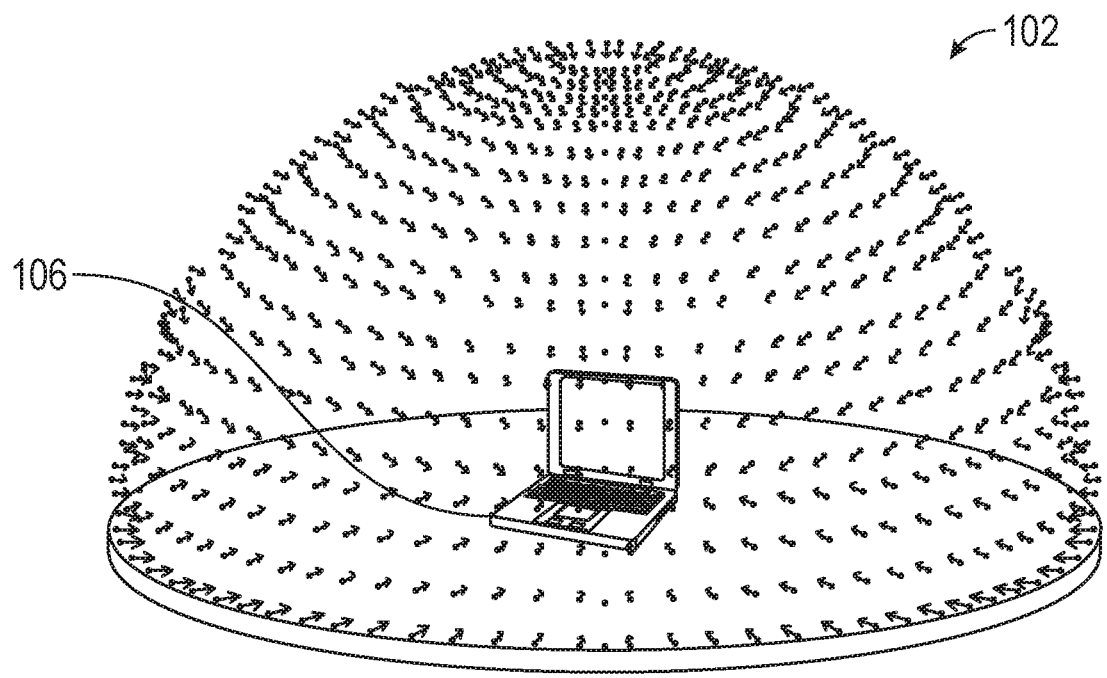

As described, various embodiments provide for compressing multi-dimensional images of objects. One such image capture system to obtain images of objects is illustrated in FIG. 1A. In the example shown in FIG. 1A, an image capture array 100 captures a number of images of an object. The image capture array 100 includes a number of cameras 104-1, 104-2, . . . 104-$n$ or other image capture devices, which are positioned about a platen 102. The image capture devices can include RGB cameras, infrared sensors, and/or other devices. The illustrative cameras 104-1, 104-2, . . . 104-$n$ capture images of the platen 102 and background without an object present, such that there is a background image associated with each viewpoint. An object 106 to be rendered is positioned on the platen 102. The cameras 104-1, 104-2, . . . 104-$n$ capture images of the object 106, the platen rotates, and additional images are captured from different viewpoints. The number of rotations and the number of cameras 104-1, 104-2, . . . 104-$n$ can vary. For example, in embodiments, 19 cameras and 72 rotations can be used. This results in 19 background images, one for each camera, and 1,368 object images, one per camera per platen position. As noted, however, these numbers can be varied. In this example case, however, 1,368 object images, 1,368 segmentation masks, and an object mesh structure are all part of the client device package sent to the client device. As illustrated in FIG. 1B, this results in capturing object images from a number of different viewpoints in a hemisphere 102 about the object 106. The "density" of this viewpoint hemisphere 102, or total number of viewpoints contained, depends on the number of image capture devices used and the number of platen positions at which images are captured.

Figure 2A:
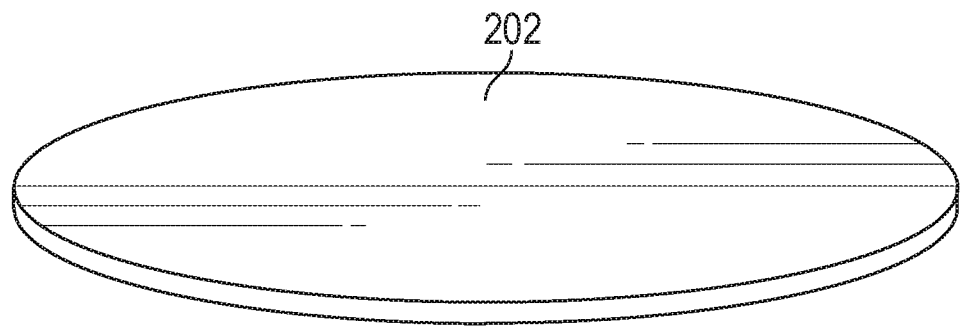
FIGS. 2A-B illustrate an example background image and object image that can be utilized in accordance with various embodiments.
Figure 2B:
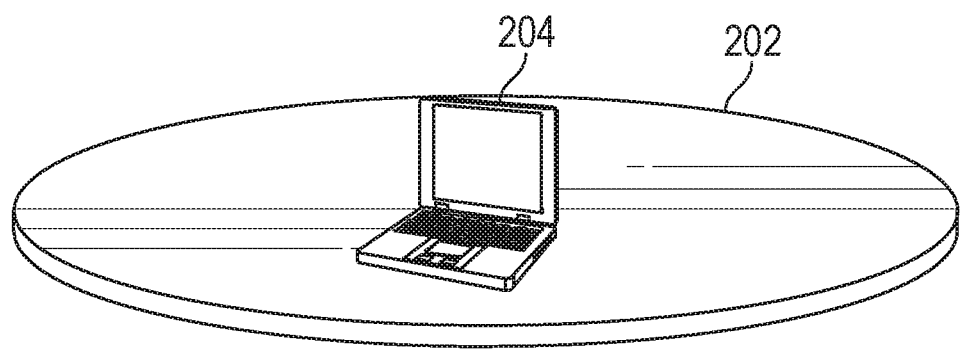

As described above, one step in creating a segmentation mask can include subtracting a background image from an object image. FIGS. 2A-B illustrate an example pairing of a background image with its object image, which pairing can be used to generate a segmentation mask. As shown in FIG. 2A, a background image is captured without an object present. FIG. 2B illustrates the image taken again with the platen 202 in the same position, but with a laptop 204, as an example, placed on the platen 202. As described above, the background images, such as the image in FIG. 2A is taken before an object is placed on the platen 202. In embodiments, all cameras are stationary. That is, only the object to be rendered moves during the image capture process. Accordingly, a set of background images is captured at an initial platen position, one background image for each camera. Then, a set of object images, such as that shown in FIG. 2B is captured at the initial platen position. When the platen 202 rotates to a second platen position, a second set of object images is captured. These object images, and those taken at subsequent platen positions, do not require a new set of background images. Because, in embodiments, the cameras do not move, the background images captured initially can be associated with their respective cameras. This association allows each object image to be associated with the background image tied to the camera that captured the object image. Therefore, for example, multiple images can be captured from a single camera during multiple respective platen positions. For each of these object images, the background image will be the same, namely the image captured by that camera before an object was placed on the platen. Therefore, the image difference that is created for each of these object images relies on subtracting that particular background image. In the ideal case, the subtraction leaves only the object because the only difference between an object image and its background image should be the object itself. Errors that occur, for example due to misalignment of the background image and the object image, can be adjusted for when the segmentation mask is created.

Figure 3A:
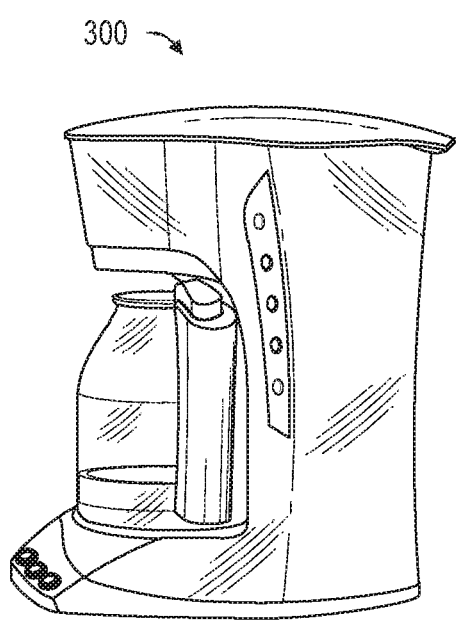
FIGS. 3A-B illustrate an example object and corresponding segmentation mask that can be utilized in accordance with various embodiments.
Figure 3B:
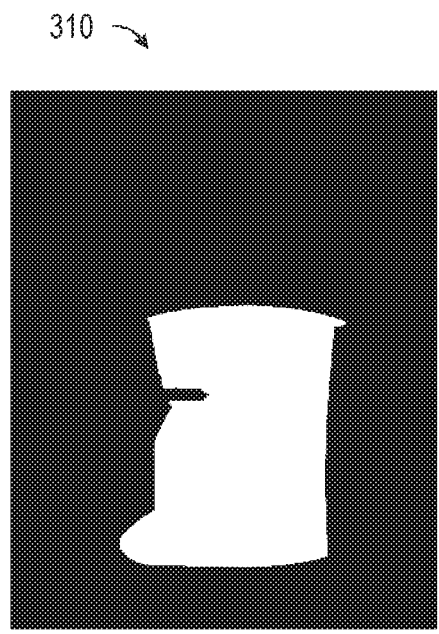

As described above, a segmentation mask is a representation of an object that shows pixels that are associated with the object. In embodiments, an object image is captured and a segmentation mask is created based on the object image. FIGS. 3A-B illustrate an example segmentation mask 310 that can be created from a picture of an object 300. As described above, the segmentation mask shows pixels associated with the object and pixels not associated with the object, respectively in the filled area (white) and unfilled area (black) of the segmentation mask. In embodiments, a background image is subtracted from an object image to create a difference image. A high confidence image mask and low confidence image mask can be created based on the difference image. These masks can indicate with varying degrees of confidence how likely it is that a given pixel is associated with the object 300. A high confidence image mask can indicate pixels that contrast with the background by a given threshold. A low confidence image mask can indicate pixels that contrast with the background by a second, lower threshold, indicating a lower degree of confidence that the pixel is associated with the object as opposed to the background. In embodiments, a segmentation mask 310 can include all high confidence pixels and the subset of low confidence pixels that can be connected to a high confidence pixel without crossing an object contour. The set of all segmentation masks can be used to create an object mesh structure, which represents the three-dimensional structure of the object. Each segmentation mask can be thought of as including filled area, comprising object pixels, and unfilled area, comprising pixels not associated with the object.

To create the object mesh structure, a three-dimensional object environment is first determined. This is the space in which the object sits. The three-dimensional object environment can be treated as a cube or prism containing the object and the space around it. In embodiments, the object mesh structure can be created by subtracting the unfilled area from each segmentation mask from this three-dimensional object environment. In other words, the two-dimensional view provided by the segmentation mask indicates area that is not occupied by the object from that view. If this is done across all views, only the space occupied by the object remains. This is the object mesh structure. In embodiments, the object mesh structure, which includes information across all views, can be used to average out errors in individual segmentation masks by projecting the object mesh structure onto the individual segmentation masks and refining each segmentation mask based on the projection.

Figure 4A:
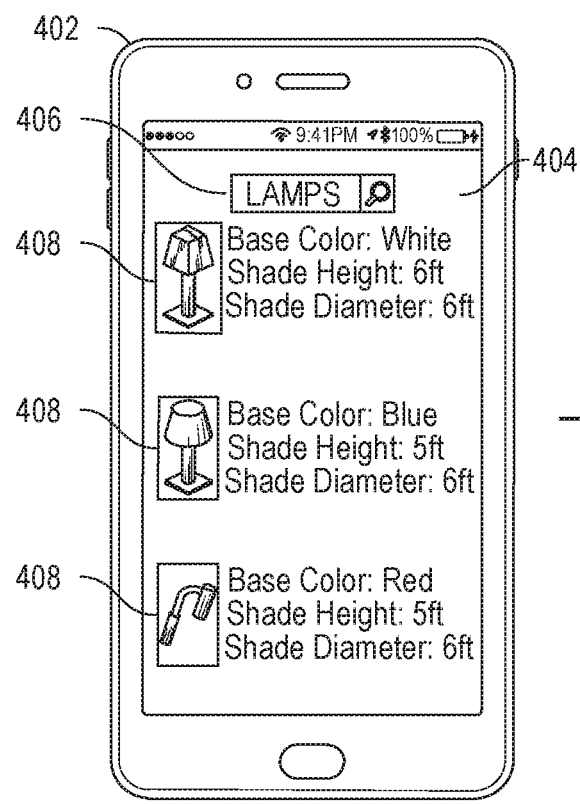
FIGS. 4A-B illustrate an example user interface that can be utilized in accordance with various embodiments.
Figure 4B:
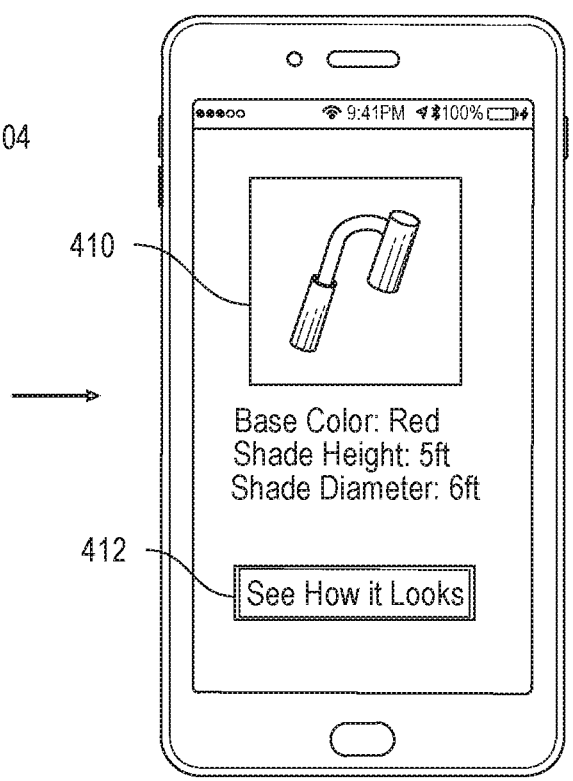

FIGS. 4A-B illustrate an example mobile application 404 that can be used to implement various embodiments. Embodiments can be implemented in the context of an electronic marketplace. The electronic marketplace can offer various items for sale to users who access the electronic marketplace, for example through a dedicated application. The application 404 can run on a mobile device 402 or other computing system. Embodiments can receive input of search parameters through a search field 406. FIGS. 4A-B illustrates a particular example in which the user searches for lamps. Other items offered by the electronic marketplace can be searched for as well. When a user searches "Lamps," for example, various lamps 408 can be presented to the user. FIG. 4B illustrates an example user interface that can be displayed in response to an item selection. The user can be shown a page with additional details about the user's selected lamp 410. A "See How It Looks" selection 412 or similar prompt can be presented to a user. When selected, the user can interact with a rendering of the selected lamp 410. In embodiments, the "See How It Looks" selection 412 or similar prompt activates an augmented reality environment to view and interact with the desired object in the context of a user's physical environment. It may be desirable for the user to interact with a photorealistic representation of the selected object, particularly in the context of the actual physical environment.

Figure 5:
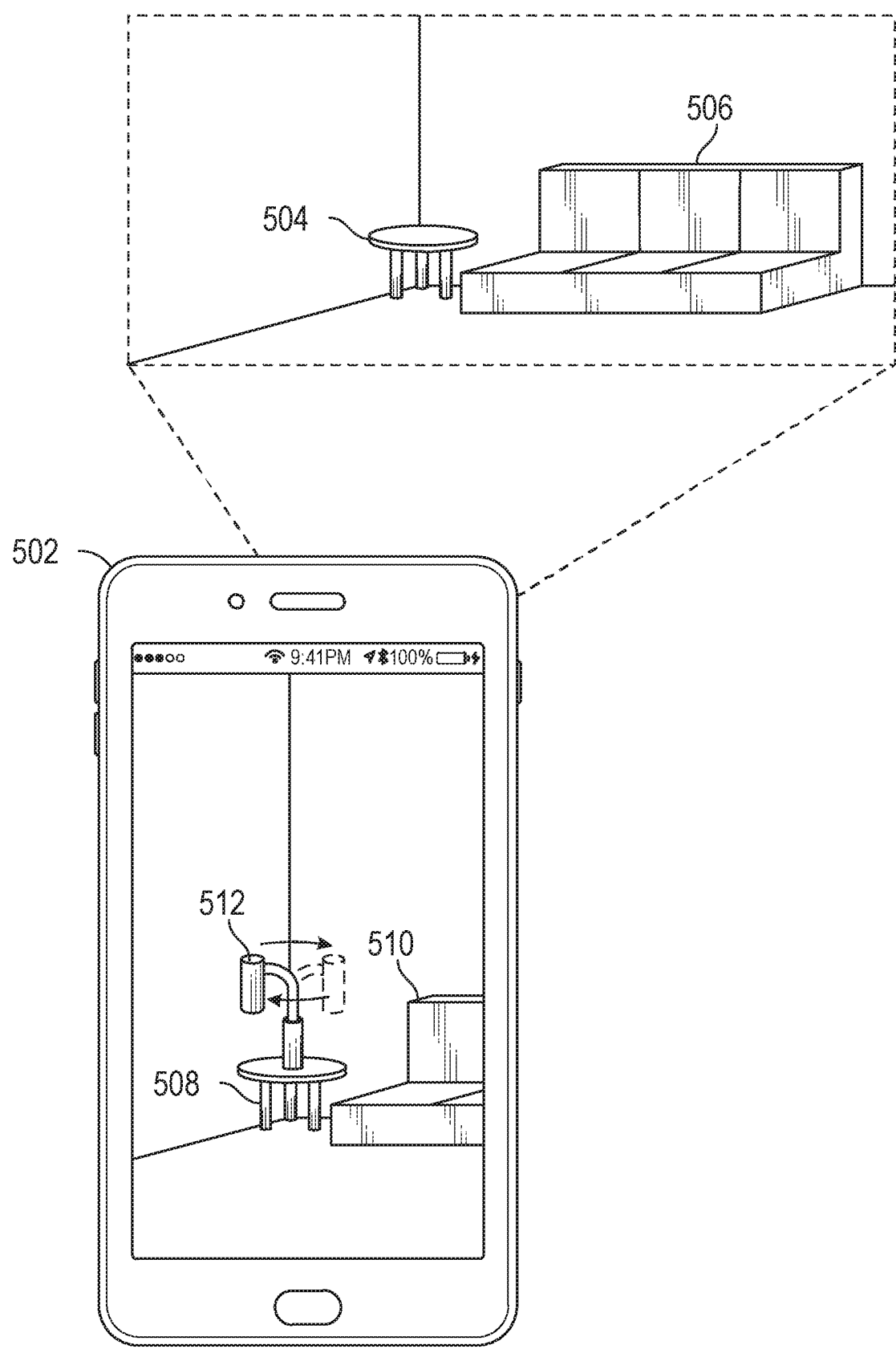
FIG. 5 illustrates an example user interface that can be utilized in accordance with various embodiments.

FIG. 5 illustrates one manner in which a user can interact with her selected item through an augmented reality setting. Continuing the above example, the selected lamp 510 can be viewed in a user's home so she can get a sense of how the lamp would actually look where she had planned to place it. For example, a user may plan to place the selected lamp 510 in her living room on an end table 504 next to her couch 506. The user can point the camera of her mobile device 502 at the end table 504. Through the mobile device's display, the user can view a representation of the lamp 512 placed on top of the end table 508. When viewing the representation of the lamp 512 through her mobile device's display, the user can compare it to the color of the couch 510 or the height of the end table 508 to name two examples. The user can also rotate the representation of the lamp 512 or move it around on the end table. This way, the user can understand how various items would look in her apartment before purchasing them.

Figure 6:
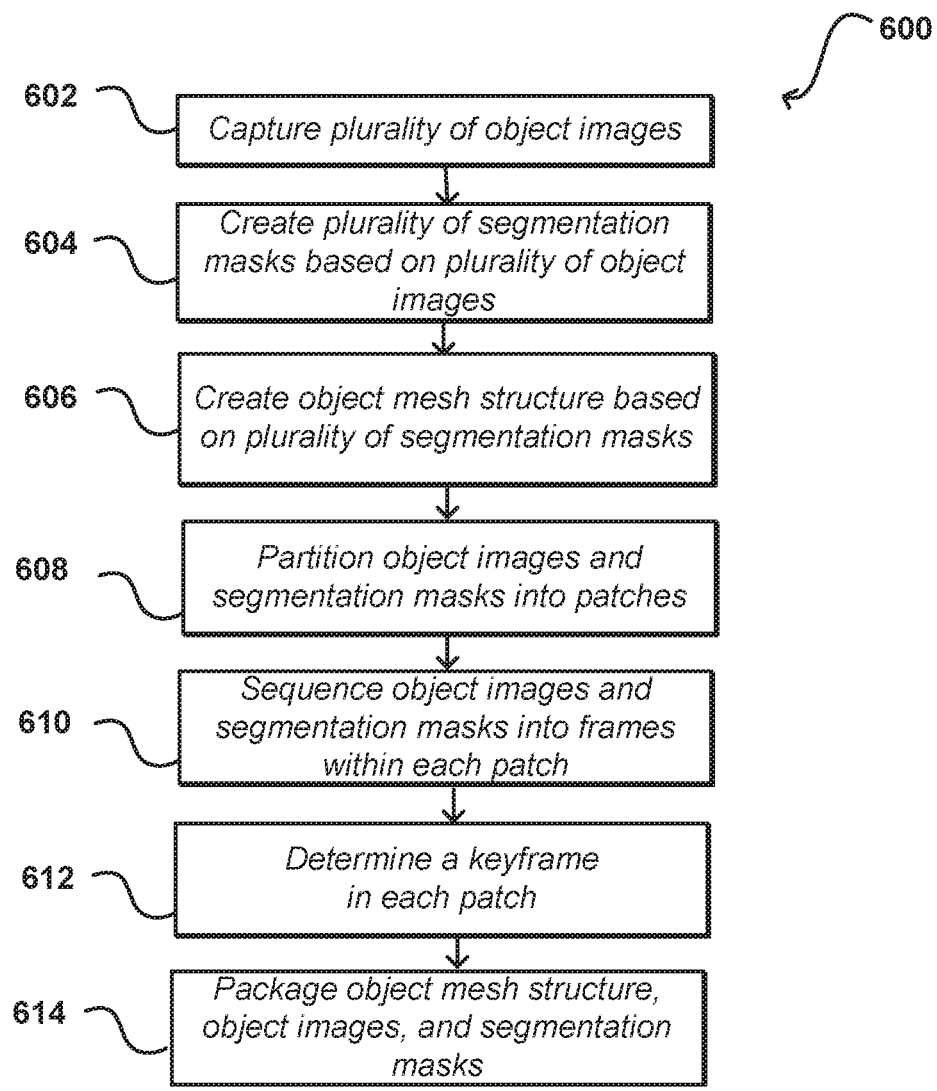
FIG. 6 illustrates an example method that can be utilized in accordance with various embodiments.

In embodiments, augmented reality experiences are implemented by rendering a representation of the object locally on a client device. In embodiments, as described herein, the client device uses the object images, segmentation masks, and object mesh structure to perform the rendering. FIG. 6 illustrates an example method 600 for processing the object images. It should be understood that, for any process discussed herein, there can be additional, fewer, or alternative steps performed in similar or alternative orders, or in parallel, within the scope of the various embodiments. In embodiments, a plurality of object images are captured 602, for example using an array of image capture devices as described with respect to FIG. 1. The object images portray the object from a number of viewpoints, for example capturing images in a hemisphere around the object. A plurality of segmentation masks are created based on the plurality of object images 604. As described above, the segmentation masks indicate which pixels are associated with the object. The segmentation masks are then used to create an object mesh structure 606. The object images and segmentation masks are then partitioned into patches 608, which are local groups of images or masks. Each patch represents a group of images. The group of images can be partitioned based on the latitude and longitude of the images, as described more thoroughly below with respect to FIGS. 10A-C.

The images in a local patch can be mapped to neighboring images. The patches can be formed based, for example, on the latitudes and longitudes of the viewpoints associated with those images. Various patch sizes can be used, including for example 2×2, 3×3, 4×5, etc. In embodiments, all patches are the same size, though in embodiments, the patch sizes can differ. The object images and segmentation masks are sequenced into frames within each patch 610. In other words, within a given patch the frames progress consecutively. The last number of a given patch is followed by the next consecutive number as the first frame of the next patch. In embodiments, each patch includes a keyframe. For example, the first frame in each patch can be designated the keyframe for that patch. The keyframe can be used as a reference frame to quickly locate a particular frame in a patch. Instead of crawling all frames for a particular frame that is being sought, the nearest keyframe can be located, and the frame being searched for can be retrieved from that patch. This process can be used to encode the object images and segmentation masks into video files, for example using an mp4 file format. The object mesh structure, segmentation masks, and object images can be packaged 614 and sent to a client device upon request.

Figure 7:
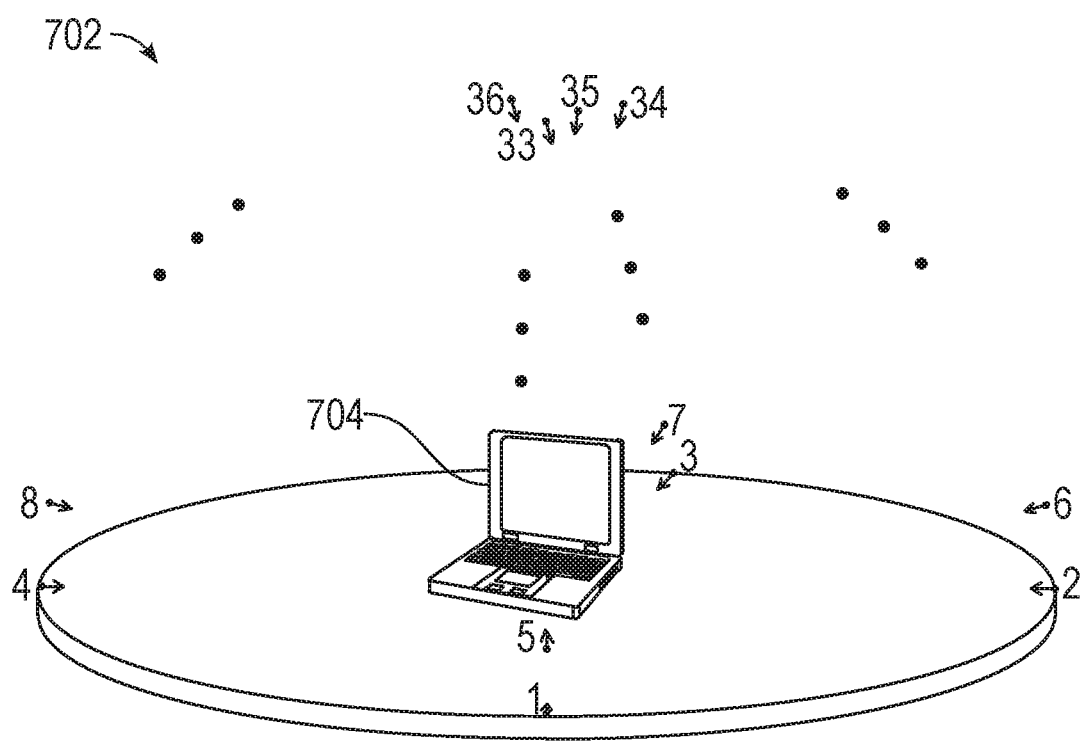
FIG. 7 illustrates an example subset of viewpoints in accordance with various embodiments.

An additional example is discussed with respect to a subset of the views discussed in reference to FIG. 1. As described in FIG. 1, a hemisphere of viewpoints can be captured around an object, portraying the object from a plurality of different angles. For example, 19 cameras can capture images at each of 72 platen positions for a total of 1,368 viewpoints represented. FIG. 7 illustrates an example embodiment in which object images are captured from 36 viewpoints. In this example, viewpoints 1 through 4 are captured at the lowest latitude, or the position closest to the platen. Although the viewpoints are captured in a hemisphere in this example, we can state that viewpoint 1 has the lowest longitude, and that as we progress around the hemisphere, the longitude increases. Therefore, in this particular example, viewpoint 1 has the lowest longitude and viewpoint 4 has the highest longitude of the four viewpoints in the lowest plane. Proceeding up a plane, viewpoints 5 through 8 are at a higher latitude than viewpoints 1 through 4. The same convention can be applied to sort those viewpoints by longitude as well. The ellipses represent viewpoints 9 through 31, which are not shown. At the highest latitude in this example are viewpoints 33 through 36.

Figure 8:
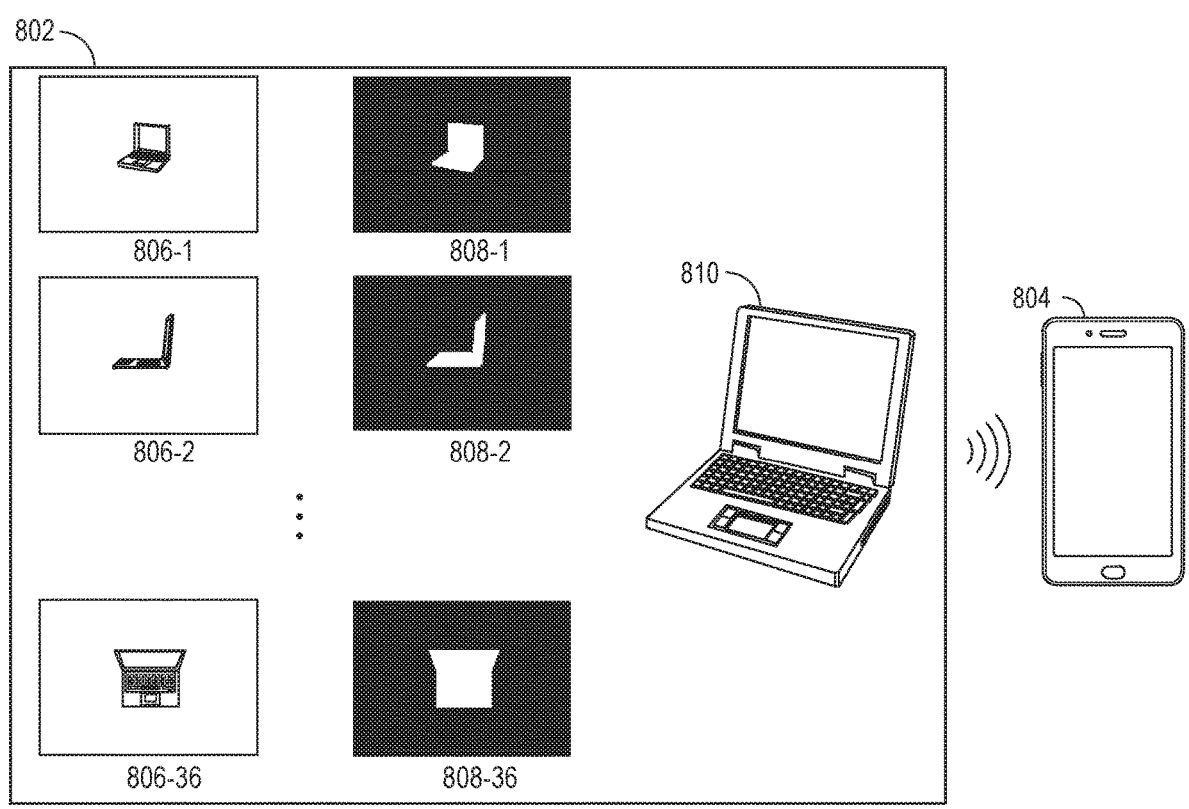
FIG. 8 illustrates an example file that can be sent to a client device in accordance with various embodiments.

As described above, after object images are captured, segmentation masks can be created based on the object images, and an object mesh structure can be created based on the segmentation masks. FIG. 8 illustrates how the various components are transferred to a client device 804. Object images 806-1, 806-2, . . . 806-36 are captured portraying the object from various viewpoints. In this example, the object images 806-1, 806-2, . . . 806-36 have had their backgrounds whited out before sending the images to the client device 804. This further reduces the payload because each individual image contains fewer pixels and therefore less data. For example, the platen that would have been captured in the object images is not seen in object images 806-1, 806-2, . . . 806-36. Therefore, the pixels associated with that platen are not part of the client device package 802 sent to the client device 804.

Segmentation masks 808-1, 808-2, . . . 808-36 are created for each of these object images 806-1, 806-2, . . . 806-36. In embodiments, the segmentation masks 808-1, 808-2, . . . 808-36 are used to white out the non-object portions of the object images 806-1, 806-2, . . . 806-36 as discussed above. The segmentation masks 808-1, 808-2, . . . 808-36 are used to create an object mesh structure 810 of the object being rendered. The object images and segmentation masks are encoded into video files, for example mp4 files or another video file format type. In embodiments, before video encoding, the object images and segmentation masks are grouped and ordered into frames. For example, the images and masks can be grouped so that each group represents a portion of the object. The latitude and longitude associated with the images and masks can be used to organize the images and masks into groups. For instance, it can be determined that two object images represent adjacent viewpoints because they share the same latitude—they are in the same horizontal plane—but they differ by one in longitude. These two images can be grouped with the two images just above them in the viewpoint hemisphere i.e. the images captured at viewpoints with one higher latitude than the first two images but sharing the same longitudes. In this manner, a 2×2 patch, or group, can be created. Additional groupings are discussed further below. A keyframe can be assigned to each group, which can act as a reference frame to locate the group and quickly retrieve a random frame from within the group. In embodiments, the object images and segmentation masks can then be encoded into video files.

The components—the object image video file, the segmentation mask video file, and the object mesh structure—are part of the client device package 802. They are packaged, for example in a zip file, and sent to the client device 804. The full object images are shown in this example. In embodiments, however, the object images are cropped closely around the object itself to reduce the payload in the client device package 802. The segmentation masks can be cropped as well before sending to the client device 804. In embodiments, the cropped versions of the object images and segmentation masks have the same horizontal and vertical dimensions. In practice, the horizontal space and vertical space occupied by the object will differ from image to image. To achieve a uniform cropping, the set of all object images and segmentation masks can be stacked or aligned. Each object image can have a cropping rectangle fit to the object as viewed in that particular object image. It may be the case, for example, that the side profile of a lamp fits inside a smaller rectangle than the front profile of the same lamp. The smallest rectangle that can fit all object images in the stack can then be selected as the cropping standard, which is used to crop all object images and segmentation masks. This provides a uniform crop to all images and masks, such that every transferred image and mask has its horizontal and vertical dimensions reduced as much as possible without losing any object pixels from any of the images or masks.

The client device package 802 can also include metadata with information about the various viewpoints, including for example the latitude and longitude of each viewpoint. The metadata can include an index of these coordinates and an index of keyframes for example. The metadata can further include pose information for each image and its associated segmentation mask. The pose information indicates the angle at which a particular image was captured. In order to render the object image on a client device, the angle at which each object image was captured can be used. To record pose information, a coordinate system can be anchored on the object. That is, the origin of a three-dimensional coordinate system can be located on the object. The angle information recorded for an object image indicates (i) where the capturing camera was located in the coordinate system, and (ii) how the capturing camera was oriented with respect to the object. The rays representing the various viewpoints in FIG. 1 provide an example illustration of poses, with each point representing a camera location and each arrow representing a camera orientation. Each component of the pose—the camera location and the camera orientation—can be represented by three degrees within the coordinate system, such that each pose is defined by six degrees. Three degrees provide the camera location and another three degrees indicate the direction in which the camera was pointing during image capture. Camera intrinsics can also be recorded in the metadata sent to the client device 804. This information can include the focal lengths and principal point for each camera. The camera intrinsics can also be used during rendering.

Figure 9:
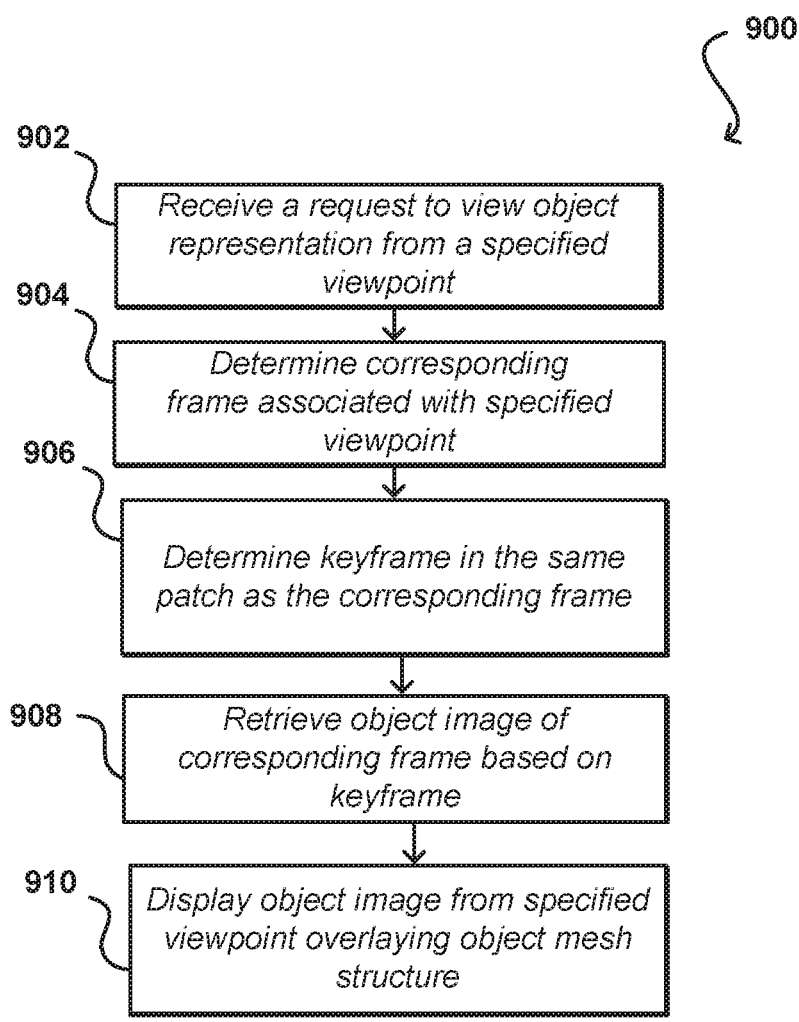
FIG. 9 illustrates an example method that can be utilized in accordance with various embodiments.

After the client device package is sent to a client device, the client device can decode the videos and render a representation of the object. FIG. 9 describes an example process that can be implemented on the client device. When the object is rendered on the client device, the user can interact with the representation. As the user rotates the object mesh structure, the user views the actual object image associated with her viewpoint overlaying the object mesh structure, thereby creating a photorealistic representation of the object. A request can be received to view the object representation from a specified viewpoint 902. For example, a user might rotate the lamp discussed in FIG. 5 to view it from a different angle than the angle at which it was first rendered. The object mesh structure will rotate and in real time the appropriate object image will be mapped onto the object mesh structure, such that the user views a photorealistic representation of the object. To locate the appropriate object image, the corresponding frame of the object image video file associated with the specified viewpoint can be determined 904. The keyframe in the same patch as that keyframe can be determined 906, and the keyframe can be used to locate the desired frame and retrieve its object image 908. As described above, the keyframe is used as a reference frame within a patch. Rather than seeking a random frame directly, a keyframe is located and the keyframe is used to retrieve the random frame. That object image portraying the specified viewpoint of the object can displayed overlaying the object mesh structure 910.

Figures 10A, 10B:
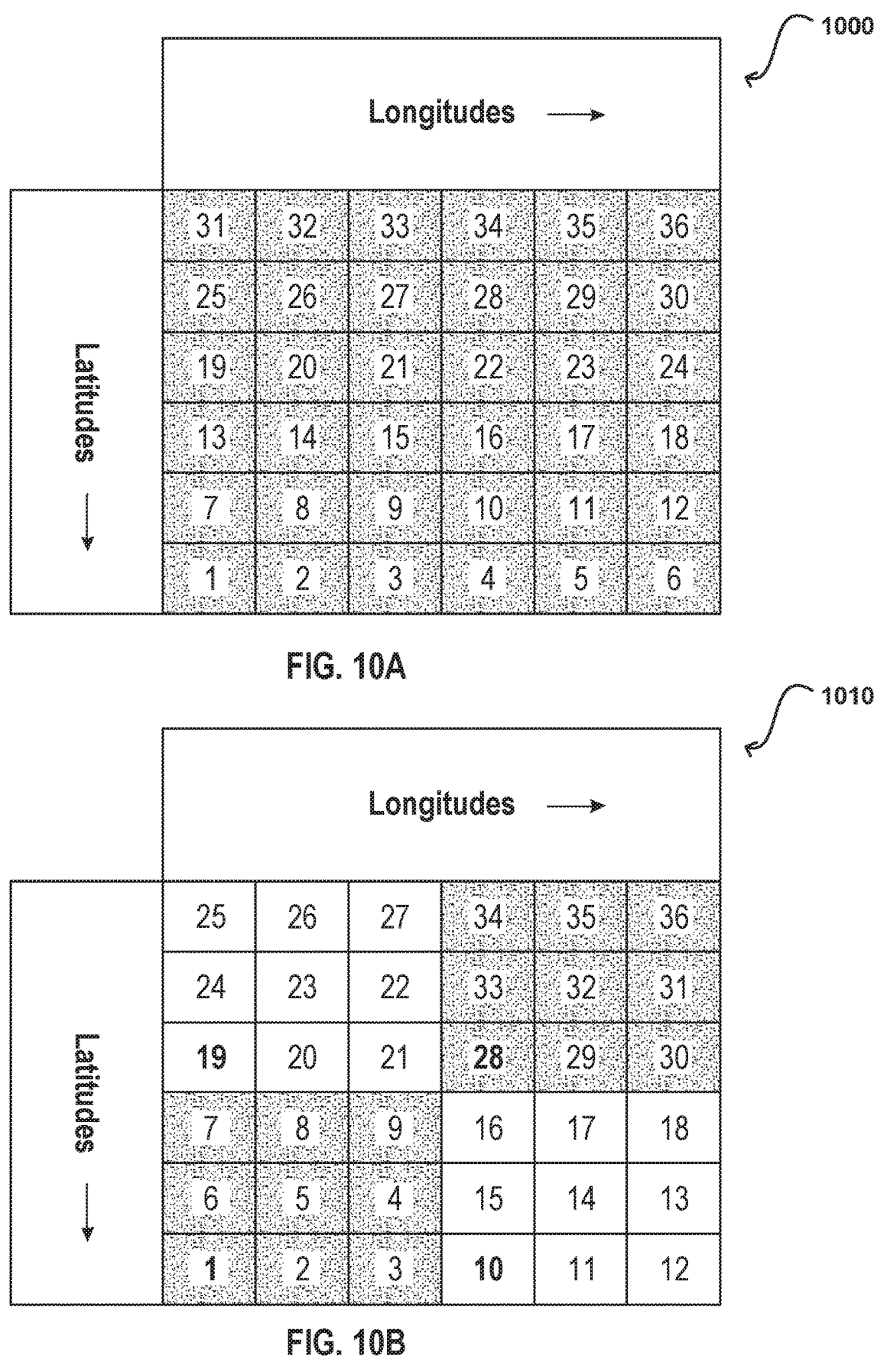
Figures 10C, 10D:
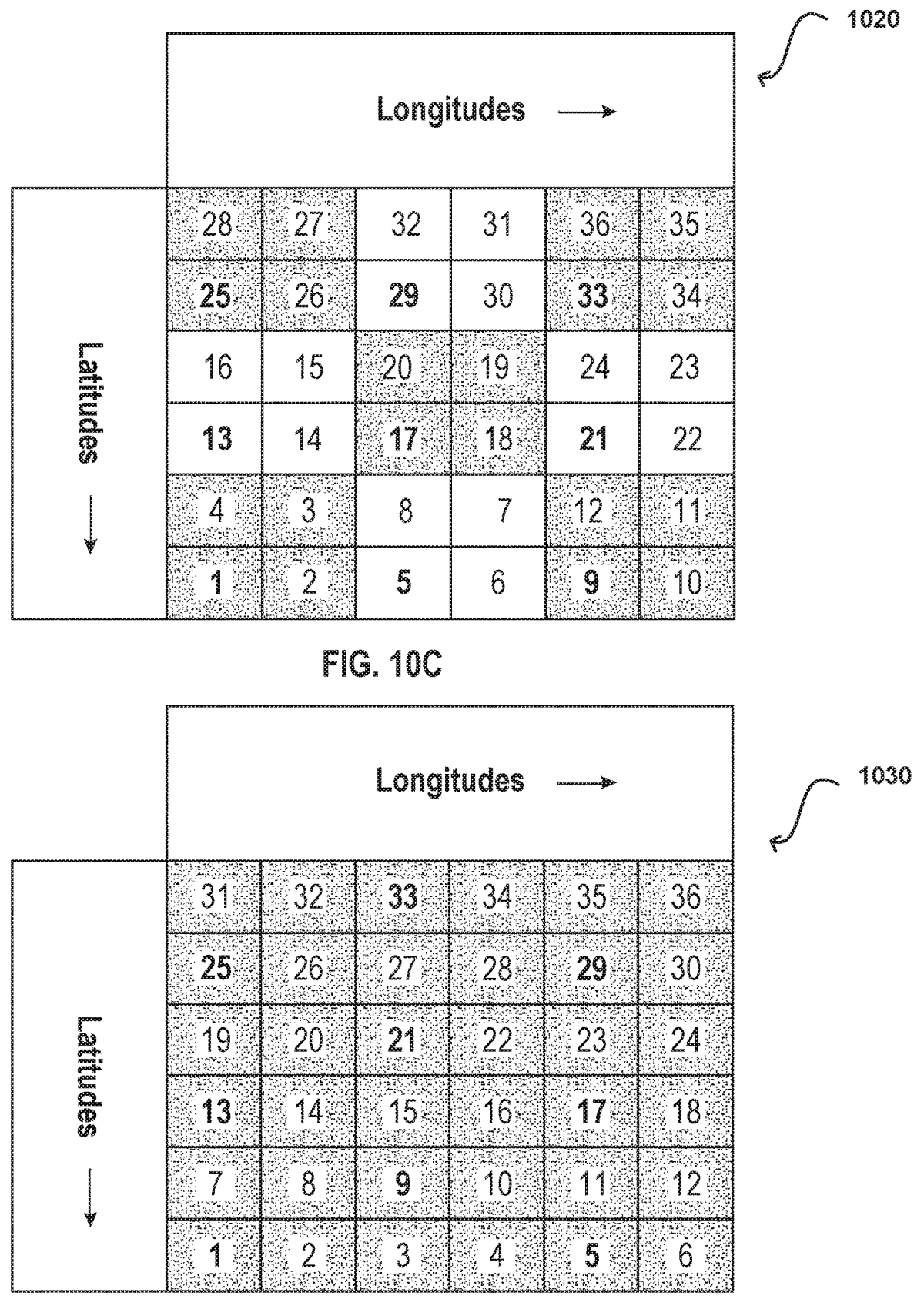

As described above, the object images and segmentation masks can be grouped before encoding the images and masks into video files. The groups, or patches, can reflect local portions of the object, based on the latitude and longitude at which the images were captured. FIGS. 10A-C illustrate various embodiments with different patch sizes. The video frames can be arranged by latitude and longitude as described above. In the example of FIGS. 7-8, we are dealing with 36 viewpoints and, consequently, 36 object images and 36 segmentation masks. The object images and/or the segmentation masks can be arranged by latitude and longitude in a row-major sequence 1000, as shown in FIG. 10A. In embodiments described herein, the images are arranged in patches, or groups, before encoding. For example, a 3 by 3 patch based sequencing 1010 is shown in FIG. 10B. In this embodiment, the images associated with the 36 viewpoints are arranged in four patches with nine frames in each patch. The images are sequenced, or ordered, within a local patch before sequencing continues to the next patch. For example, frames 1 through 9 are seen grouped in the lower left of grid 1010.

In embodiments, the lowest number frame in each patch is designated as the keyframe, which can be used to reference the patch. Therefore, in grid 1010, the keyframes are frames 1, 10, 19, and 28, as shown in bold, and the keyframe interval is 9. In FIG. 10C, the patch size is reduced. Grid 1020 shows an arrangement of 2×2 patches. The keyframes in this example are frames 1, 5, 9, 13, 17, 21, 25, 29, and 33, as shown in bold, and the keyframe interval is 4. Increasing the frequency of keyframes can reduce the time taken to extract a random frame from the video files. For example, grid 1020 includes 9 keyframes compared to the 4 keyframes of grid 1010. In embodiments, seeking a random frame first requires seeking the keyframe in the same patch as the random frame, so having more keyframes increases the likelihood that any random frame will either be a keyframe or be near a keyframe. In embodiments, the keyframe interval can be selected by algorithm and can be variable. In embodiments, such as some embodiments described above, the keyframe interval can be fixed, such that the number of frames between keyframes is constant. In FIG. 10D, the frames are not sequenced in patches. Grid 1030, like grid 1010, shows the frames sequenced in a spiral configuration about an object, or a row major sequence. Grid 1030, however, maintains the keyframe interval of grid 1020 illustrated in FIG. 10C. Accordingly, a keyframe occurs once every four frames in the same order as in grid 1020—1, 5, 9, 13, 17, 21, 25, 29, and 33, as shown in bold—though these same keyframe numbers correspond to different latitudes and longitudes, or different object locations. A keyframe nearest to and preceding a randomly called frame can be used as a reference for locating the random frame.

Various group sizes can be used according to various embodiments. For example, each group can include between 1 and 16 frames. In various embodiments, each group can include between 3 and 9 frames. In various embodiments, each group can include between 4 and 6 frames. As described above, the images and masks can be ordered into frames within individual groups before encoding the images and masks into a video file in frame order. In embodiments, the video files can be encoded in MPEG4, H.264, or other formats. In embodiments, the YUV420 pixel format can be used.

Figure 11:
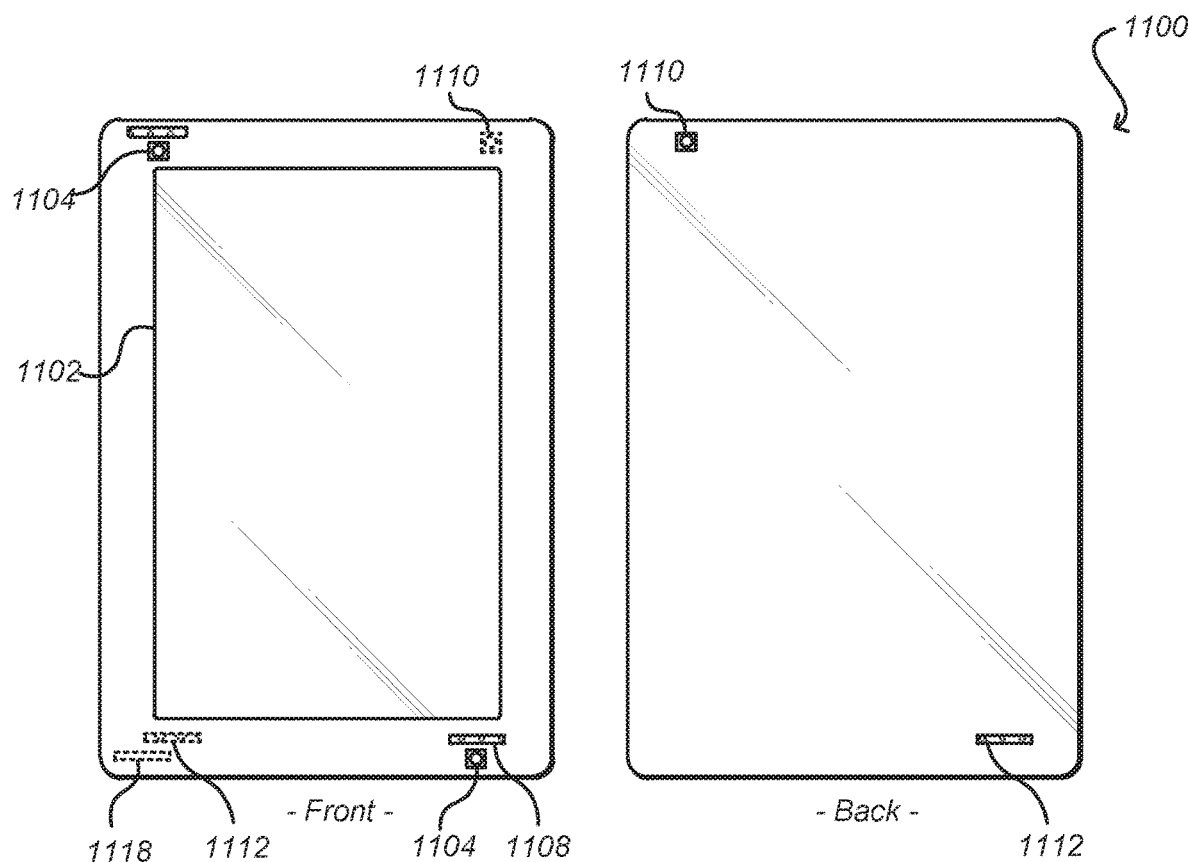
FIG. 11 illustrates an example computing device that can be used in accordance with various embodiments.
Figure 12:
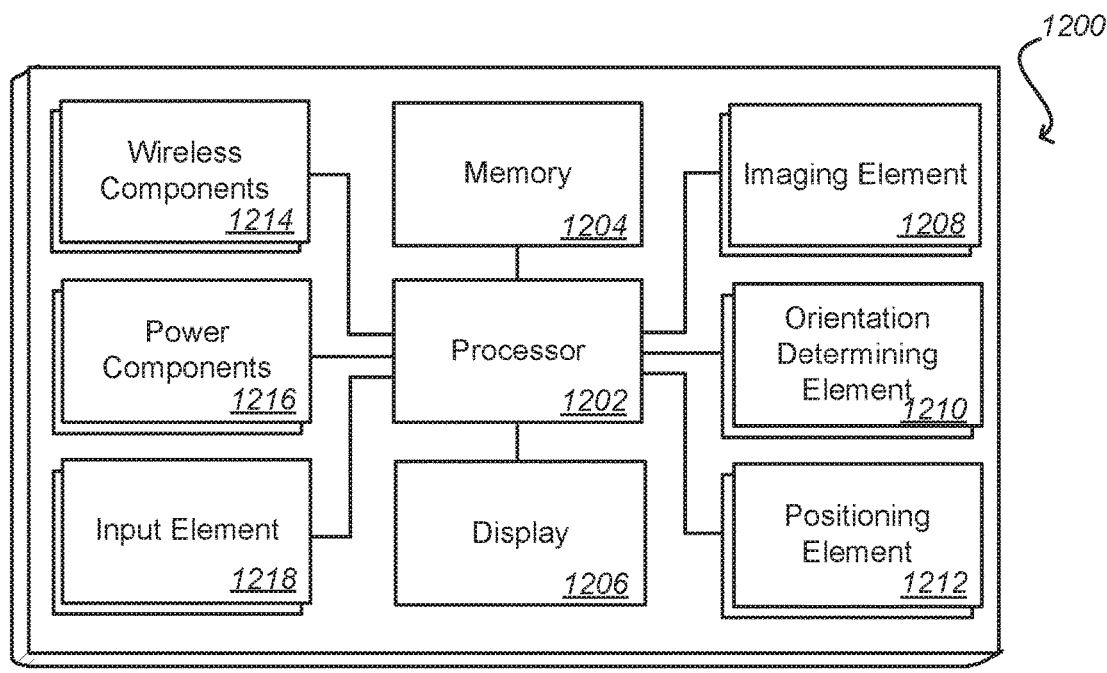
FIG. 12 illustrates a set of example components of one or more devices of the present disclosure in accordance with various embodiments.
Figure 13:
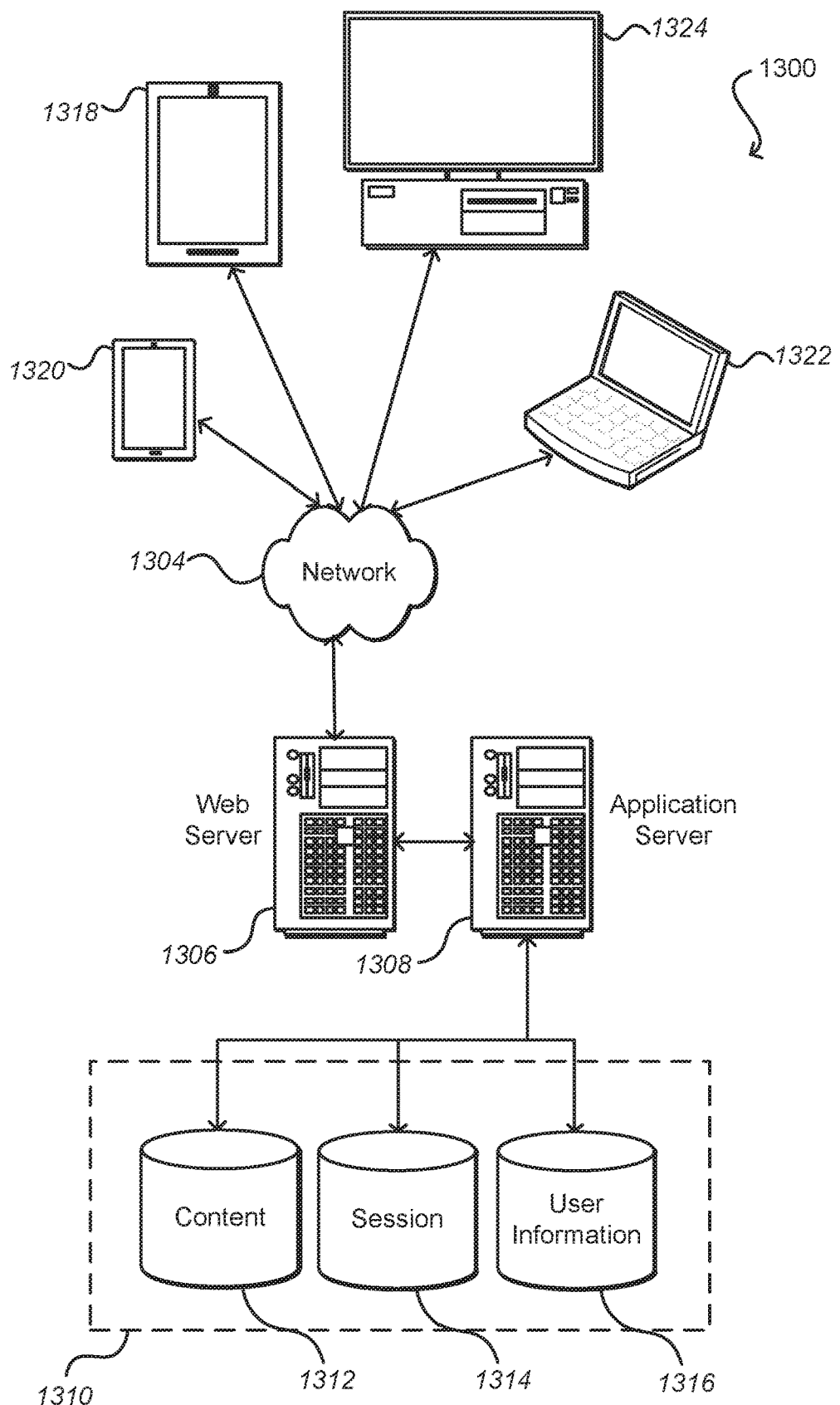
FIG. 13 illustrates an example computing environment that can be used to implement aspects of various embodiments.

FIGS. 11-13 illustrate a set of basic components of an example computing device 1100 that can be utilized to implement aspects of the various embodiments. In this example, the device 1100, 1200 includes at least one processor 1202 for executing instructions that can be stored in a memory device or element 1204. As would be apparent to one of ordinary skill in the art, the device can include many types of memory, data storage or computer-readable media, such as a first data storage for program instructions for execution by the at least one processor 1602, the same or separate storage can be used for images or data, a removable memory can be available for sharing information with other devices, and any number of communication approaches can be available for sharing with other devices. The device may include at least one type of display element 1102, such as a touch screen, electronic ink (e-ink), organic light emitting diode (OLED) or liquid crystal display (LCD), although devices such as servers might convey information via other means, such as through a system of lights and data transmissions. The device typically will include one or more networking components, such as a port, network interface card, or wireless transceiver that enables communication over at least one network. The device can include at least one input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The device 1100, 1200 can include one or more imaging elements 1110, 1208. One or more orientation determining elements 1210 can determine the orientation of the device, for example in relation to a user's face or eyes. Various camera-based and other sensors 1104, 1108, 1112, 1118 can be used to determine orientation. A positioning element 1212 can determine the position of the device. The positioning element 1212 can use one or more of GPS, local network detection, Bluetooth connection, or other protocols. One or more input elements 1210 can register user input, for example input received from a touch screen display. An example device 1100, 1200 will also include power components 1216 and wireless components 1214 to communicate with other devices wirelessly.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment 1300 includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store as needed to execute aspects of one or more applications for the client device and handling a majority of the data access and business logic for an application. The application server 1308 provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server 1306. It should be understood that the Web server 1706 and application servers 1308 are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store 1310 illustrated includes mechanisms for storing content 1312 (e.g., production data) and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store. The data store 1310 is operable, through logic associated therewith, to receive instructions from the application server and obtain, update or otherwise process data in response thereto. In one example, a user might submit a search request for a certain type of item. In this case, the data store 1310 might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server 1306, 1308 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 1300 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices 1318, 1320, 1322, 1324 which can be used to operate any of a number of applications. User or client devices 1318, 1320, 1322, 1324 can include any of a number of general purpose personal computers, such as desktop 1324 or laptop computers 1322 running a standard operating system, as well as cellular, wireless and handheld devices 1318, 1320 running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network 1304 that would be familiar to those skilled in the art for supporting communications using any of a variety of commercially-available protocols, such as TCP/IP, FTP, UPnP, NFS, and CIFS. The network 1304 can be, for example, a local area network, a wide-area network, a virtual private network, the Internet, an intranet, an extranet, a public switched telephone network, an infrared network, a wireless network and any combination thereof.

In embodiments utilizing a Web server 1306, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment 1300 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
under control of one or more computer systems configured with executable instructions,
capturing a plurality of object images representing a respective plurality of viewpoints of an object;
creating a plurality of segmentation masks corresponding to the plurality of object images, individual segmentation masks of the plurality of segmentation masks including filled area and unfilled area, the filled area comprising pixels associated with the object, the unfilled area comprising pixels not associated with the object;
creating an object mesh structure by subtracting the unfilled area of the individual segmentation masks of the plurality of segmentation masks from a three-dimensional object environment;
grouping the plurality of object images and the plurality of segmentation masks into a plurality of groups, an individual group of the plurality of groups representing a portion of the object;
ordering the plurality of object images and the plurality of segmentation masks into a respective plurality of frames within individual groups of the plurality of groups, such that every object image of the plurality of object images and every corresponding segmentation mask of the plurality of segmentation masks has a frame number;
determining a keyframe for every group of the plurality of groups, the keyframe for a specified group being a reference frame for specified group;
encoding, in order of the frame number, the plurality of object images and the plurality of segmentation masks respectively into an object image video file and a segmentation mask video file;
receiving, from a client device, a request to display a representation of the object;
creating a client device package including the object image video file, the segmentation mask video file, and the object mesh structure;
sending the client device package to the client device; and
displaying the representation of the object on the client device, the representation of the object including the object mesh structure overlaid by a first object image representing a first viewpoint.

2. The computer-implemented method of claim 1, wherein displaying the representation of the object on the client device comprises:
receiving a viewpoint request to view the representation of the object from a specified viewpoint;
determining a corresponding frame associated with the specified viewpoint;
determining a local keyframe, the local keyframe and the corresponding frame being in the same group of the plurality of groups; and
retrieving, based at least in part on determining the local keyframe, the object image of the plurality of object images that is associated with the specified viewpoint.

3. The computer-implemented method of claim 1, the method further comprising:
determining a horizontal dimension and a vertical dimension of the object in the plurality of object images;
cropping the plurality of object images into a plurality of cropped object images having equal dimensions, the equal dimensions comprising a lowest horizontal dimension and a lowest vertical dimension that can form a rectangle that contains the object in all of the plurality of cropped object images; and modifying the plurality of cropped object images into a plurality of modified object images in which the pixels not associated with the object are converted to white.

4. The computer-implemented method of claim 1, wherein the plurality of object images are captured by one or more cameras, and wherein the client device package further includes pose information for the plurality of object images, the pose information comprising:
a camera location component, the camera location component including a three-dimensional description of a location associated with a capturing camera for individual object images; and
a camera orientation component including a three-dimensional description of an orientation for individual cameras of the one or more cameras that captured individual object images of the plurality of object images.

5. The computer-implemented method of claim 1, wherein every group of the plurality of groups includes a fixed number of frames, the fixed number being between 1 and 16 frames.

6. A computer-implemented method, comprising:
under control of one or more computer systems configured with executable instructions,
capturing a plurality of object images portraying an object;
determining a horizontal dimension and a vertical dimension of the object in the plurality of object images;
cropping the plurality of object images into a plurality of cropped object images having equal dimensions, the equal dimensions comprising a lowest horizontal dimension and a lowest vertical dimension that can form a rectangle that contains the object in all of the plurality of cropped object images;
modifying the plurality of cropped object images into a plurality of modified object images in which pixels not associated with the object are converted to white;
ordering the plurality of modified object images respectively into a plurality of frames, such that every modified object image of the plurality of modified object images has a frame number, the plurality of modified object images ordered by the frame number;
determining a plurality of keyframes from the plurality of frames, individual keyframes of the plurality of keyframes occurring at a fixed keyframe interval; and
encoding the plurality of modified object images into a video file in order of the frame number.

7. The computer-implemented method of claim 6, further comprising:
creating a plurality of segmentation masks based at least in part on the plurality of object images, such that individual segmentation masks of the plurality of segmentation masks are respectively associated with individual object images of the plurality of object images, individual segmentation masks of the plurality of segmentation masks including filled area and unfilled area, the filled area comprising pixels associated with the object, the unfilled area comprising the pixels not associated with the object;
ordering the plurality of segmentation masks into the respective plurality of frames, such that individual segmentation masks of the plurality of segmentation masks have an identical frame number as the individual object images of the plurality of object images that are respectively associated with the individual segmentation masks of the plurality of segmentation masks; and
encoding the plurality of segmentation masks into a segmentation mask video file.

8. The computer-implemented method of claim 7, further comprising
creating an object mesh structure based at least in part on the plurality of segmentation masks by subtracting the unfilled area from the individual segmentation masks of the plurality of segmentation masks from a three-dimensional object environment.

9. The computer-implemented method of claim 8, further comprising:
creating a client device package including an object image video file, the segmentation mask video file, and the object mesh structure;
receiving a request from a client device to view a representation of the object;
sending the client device package to the client device; and
displaying the representation of the object on the client device, the representation of the object including the object mesh structure overlaid by an object image of the plurality of object images that is associated with a first viewpoint.

10. The computer-implemented method of claim 9, wherein the plurality of object images are captured by one or more image-capture devices, and wherein the client device package further includes pose information for the plurality of object images, the pose information comprising:
an image-capture device location component, the image-capture device location component including a three-dimensional description of a location associated with a capturing image-capture device for individual object images; and
an image-capture device orientation component including a three-dimensional description of an orientation for individual image-capture device of the one or more image-capture devices that captured individual object images of the plurality of object images.

11. The computer-implemented method of claim 10, wherein the fixed keyframe interval is between 1 and 16.

12. A system for compressing images, comprising:
at least one processor;
memory including instructions that, when executed by the at least one processor, cause the system to:
capture, with one or more image-capture devices, a plurality of object images portraying an object;
determine pose information for the plurality of object images, the pose information including (i) an image-capture device location component, the image-capture device location component including a three-dimensional description of a location associated with a capturing image-capture device for individual object images, and (ii) an image-capture device orientation component including a three-dimensional description of an orientation for individual image-capture devices of the one or more image-capture devices that captured individual object images of the plurality of object images;
order the plurality of object images respectively into a plurality of frames, such that every object image of the plurality of object images has a frame number, the plurality of object images ordered by the frame number;

determine a plurality of keyframes from the plurality of frames, individual keyframes of the plurality of keyframes occurring at a fixed keyframe interval; and encode the plurality of object images with the pose information into a video file in order of the frame number.

13. The system of claim 12, wherein the memory further includes instructions that, when executed by the at least one processor, cause the system to:

create a plurality of segmentation masks based at least in part on the plurality of object images, such that individual segmentation masks of the plurality of segmentation masks are respectively associated with individual object images of the plurality of object images, individual segmentation masks of the plurality of segmentation masks including filled area and unfilled area, the filled area comprising pixels associated with the object, the unfilled area comprising pixels not associated with the object;

order the plurality of segmentation masks respectively into a plurality of frames, such that individual segmentation masks of the plurality of segmentation masks have an identical frame number as the individual object images of the plurality of object images that are respectively associated with the individual segmentation masks of the plurality of segmentation masks; and encode the plurality of segmentation masks into a segmentation mask video file in order of the frame number.

14. The system of claim 13, wherein the memory further includes instructions that, when executed by the at least one processor, cause the system to:

create an object mesh structure by subtracting the unfilled area from individual segmentation masks of the plurality of segmentation masks from a three-dimensional object environment.

15. The system of claim 13, the memory further includes instructions that, when executed by the at least one processor, cause the system to:

create a client device package including an object image video file, the segmentation mask video file, and the object mesh structure;

receive a request from a client device to view a representation of the object;

send the client device package to the client device; and display the representation of the object on the client device, the representation of the object including the object mesh structure overlaid by an object image of the plurality of object images that is associated with a first viewpoint.

16. The system of claim 15, wherein the memory further includes instructions that, when executed by the at least one processor, cause the system to:

receive a viewpoint request to view the representation of the client device from a second viewpoint;

determine a second viewpoint frame;

determine a particular keyframe nearest to and preceding the second viewpoint frame;

retrieve the object image associated with the second viewpoint based at least in part on determining the particular keyframe nearest to and preceding the second viewpoint frame; and display the object mesh structure overlaid by the object image of the plurality of object images that is associated with the second viewpoint.

17. The system of claim 15, wherein the fixed keyframe interval is between 1 and 16.

18. The system of claim 13, wherein the memory further includes instructions that, when executed by the at least one processor, cause the system to:

determine a horizontal dimension and a vertical dimension of the object in the plurality of object images; and crop the plurality of object images into a plurality of cropped object images having equal dimensions, the equal dimensions comprising a lowest horizontal dimension and a lowest vertical dimension that can form a rectangle that contains the object in all object images of the plurality of object images.

19. The system of claim 18, wherein the memory further includes instructions that, when executed by the at least one processor, cause the system to:

modify the plurality of cropped object images into a plurality of modified object images in which the pixels not associated with the object are converted to white.

20. The system of claim 19, wherein converting pixels in the plurality of cropped object images to white includes using an associated segmentation mask to distinguish between pixels associated with the object and the pixels not associated with the object in individual object images of the plurality of object images.

* * * * *